C. AND L. LERNER.
SAFETY DEVICE FOR CARS.
APPLICATION FILED APR. 18, 1919.
1,359,396.
Patented Nov. 16, 1920.
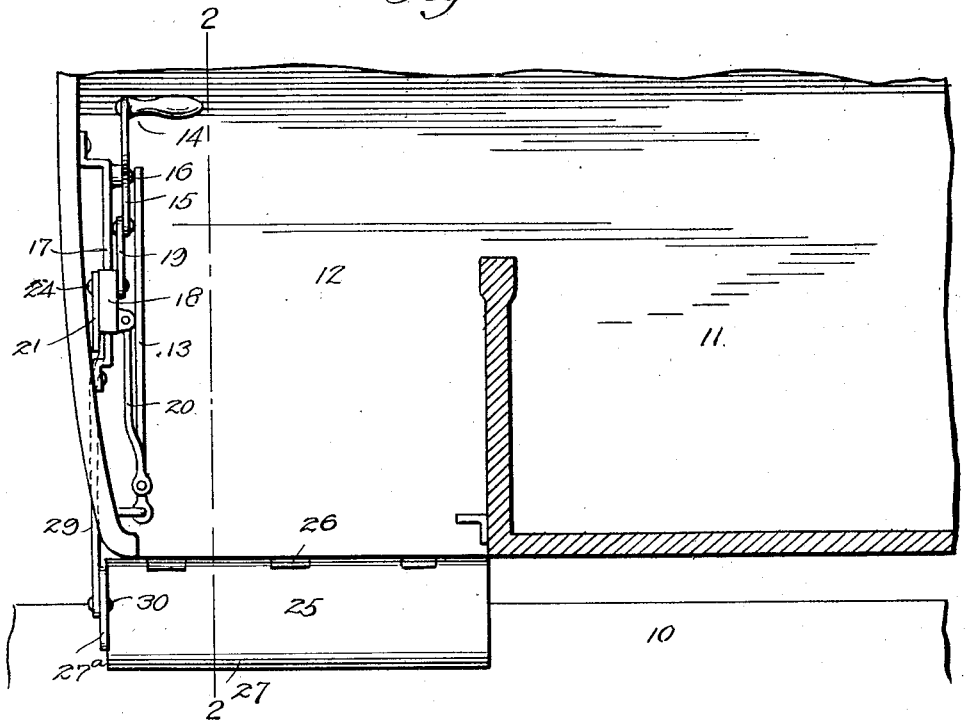
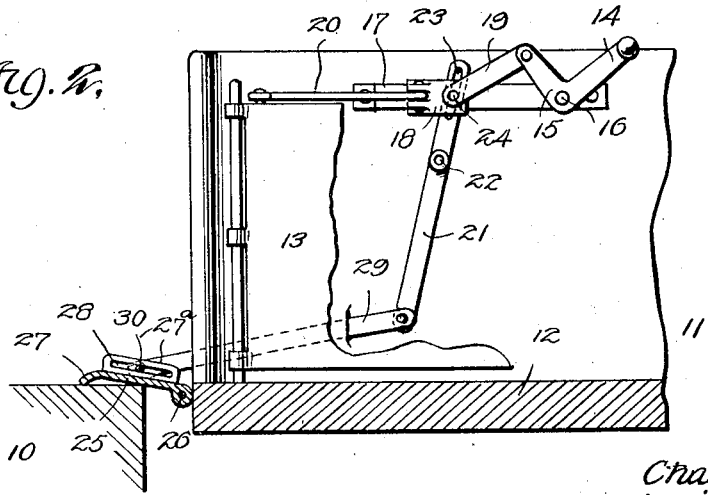
INVENTOR
Charles Lerner
Louis Lerner
BY
Victor J. Evans
ATTY.

UNITED STATES PATENT OFFICE.

CHARLES LERNER AND LOUIS LERNER, OF NEW BRUNSWICK, NEW JERSEY.

SAFETY DEVICE FOR CARS.

1,359,396.  Specification of Letters Patent.  Patented Nov. 16, 1920.

Application filed April 18, 1919. Serial No. 291,100.

*To all whom it may concern:*

Be it known that we, CHARLES LERNER and LOUIS LERNER, subjects of the King of England, residing at New Brunswick, in the county of Middlesex and State of New Jersey, have invented new and useful Improvements in Safety Devices for Cars, of which the following is a specification.

This invention relates to safety devices for cars and has particular reference to a safety tread for the same.

It has been observed that the majority of subway, elevated and other railroad systems provided with platforms at the stations which are on a level with the car floor, a substantial space occurs between the car door platform and the station platform which is very dangerous to passengers entering and leaving the car. This space is more appreciable where the platform is arranged on a curve and it is ofttimes necessary to provide sliding platforms which are adapted to be projected against the side of the car in order to eliminate danger to the passengers.

One of the principal objects of the invention is the provision of a pivoted tread which is thrown into active position simultaneously with the opening of the car door in order to bridge the space between the car door platform and the station platform.

Another object of the invention is the provision of a safety tread and means whereby the same will readily adapt itself to varying heights of platform, without danger of tripping the passengers entering and leaving the car.

Another object of the invention is the provision of a device of the class described which is of simple construction, inexpensive to manufacture and which may be readily installed on any standard type of car now in use.

With these and other objects in view the invention resides in the novel construction, combination and arrangement of parts more fully described and pointed out in the following description and claims and illustrated in the accompanying drawings in which:

Figure 1 is a horizontal fragmentary sectional view through the car showing the application of the safety tread thereto.

Fig. 2 is a transverse sectional view through the same on the line 2—2 of Fig. 1.

Referring to the drawings by characters of reference 10 designates a station platform which is on substantially the same level with the floor of the car 11. This car is provided with the usual platform 12 and movable door 13 which is operated by means of a suitable mechanism which includes the handle 14, the same being in the nature of a bell crank lever 15 which is pivoted as at 16 to the bar 17 secured to the vestibule of the car. A sliding member 18 is adapted to move over the bar 17 and is connected with bell crank lever 15 by means of a link 19. A link 20 is connected at one end to the sliding member 18 and at the remaining end to the door 13 whereby the door may be opened and closed upon operation of the handle 14. A lever 21 is pivoted as at 22 to the vestibule of the car and is slotted as at 23 for the reception of the pin 24 whereby the lever 21 is operated by the sliding member 18. A tread member 25 is pivotally secured as at 26 to the car door platform as illustrated in the drawing and is provided with a downturned portion 27 for a purpose to be hereinafter described. The tread member is provided with an upstanding lug $27^a$ which is slotted as at 28. A link 29 is secured at its inner end to the lever 21 and the remaining extremity is provided with a trunnion 30 which engages with the slotted portion 28 of the lug 27. It will thus be seen that upon operation of the handle 14 to open the door 13 through the door operating mechanism described the tread member 25 will be tilted to a position to contact with and bridge the space between the car and the station platform. The slotted portion of the lug 27 coacts with the link 29 to allow the tread member an independent movement whereby the tread member may accommodate itself to varying heights of platform and the downturned portion 27 is provided as illustrated in order to prevent the tripping of passengers entering the car.

While we have illustrated and described a simple and preferred form of carrying our invention into practice we do not care to be limited to the exact details therein exhibited, but desire to make such necessary changes as fall within the scope of the appended claims.

What is claimed as new is:

1. In a device of the class described, the combination of a door, a tread member, a slidably mounted block, lost-motion connections from said block to said door and to said tread member for operating the same, and operating means for said block.

2. In a device of the class described, the combination of a door, a tread member, a slidably mounted block, connections from said block to said door, lost-motion connection between said block and said tread member, and operating means for said block.

3. In a device of the class described, the combination of a tread member having a slot formed therein and means co-active with the slot of said tread member and operable for raising and lowering said tread member as and for the purpose described.

4. A tread member comprising a sheet of material formed with pivoting means and with a rolled edge, and a lug turned up at the side of said member and provided with a slot as and for the purpose set forth.

In testimony whereof we affix our signatures.

CHAS. LERNER.
LOUIS LERNER.